United States Patent [19]

Walther

[11] 3,722,914
[45] Mar. 27, 1973

[54] SLIDER MOUNT FOR FIFTH WHEELS

[75] Inventor: William D. Walther, Dayton, Ohio

[73] Assignee: The Dayton Steel Foundry Company, Dayton, Ohio

[22] Filed: June 10, 1971

[21] Appl. No.: 151,834

[52] U.S. Cl. .................................. 280/407
[51] Int. Cl. ............................... B62d 53/06
[58] Field of Search ............................ 280/407

[56] References Cited

UNITED STATES PATENTS

| 3,170,716 | 2/1965 | Walther et al. | 280/407 |
| 2,985,463 | 5/1961 | Geerds | 280/407 |
| 3,339,941 | 9/1967 | Braunberger | 280/407 |
| 3,030,125 | 4/1962 | Braunberger | 280/407 |
| 2,589,678 | 3/1952 | DeLay | 280/407 X |
| 3,606,384 | 9/1971 | Fontaine et al. | 280/407 |

Primary Examiner—Leo Friaglia
Attorney—Mack D. Cook

[57] ABSTRACT

Slider mount to adjust position of fifth wheel coupler assembly with power operated locking mechanism. Coupler mounting trunnions are carried medially of transverse double span slides moving on parallel composite rail members. Locking mechanism carried on the support member beneath the trunnions includes reciprocating plungers having angulated locking faces selectively engaging correspondingly shaped notches formed integrally in the rail members.

3 Claims, 5 Drawing Figures

INVENTOR.
WILLIAM D. WALTHER

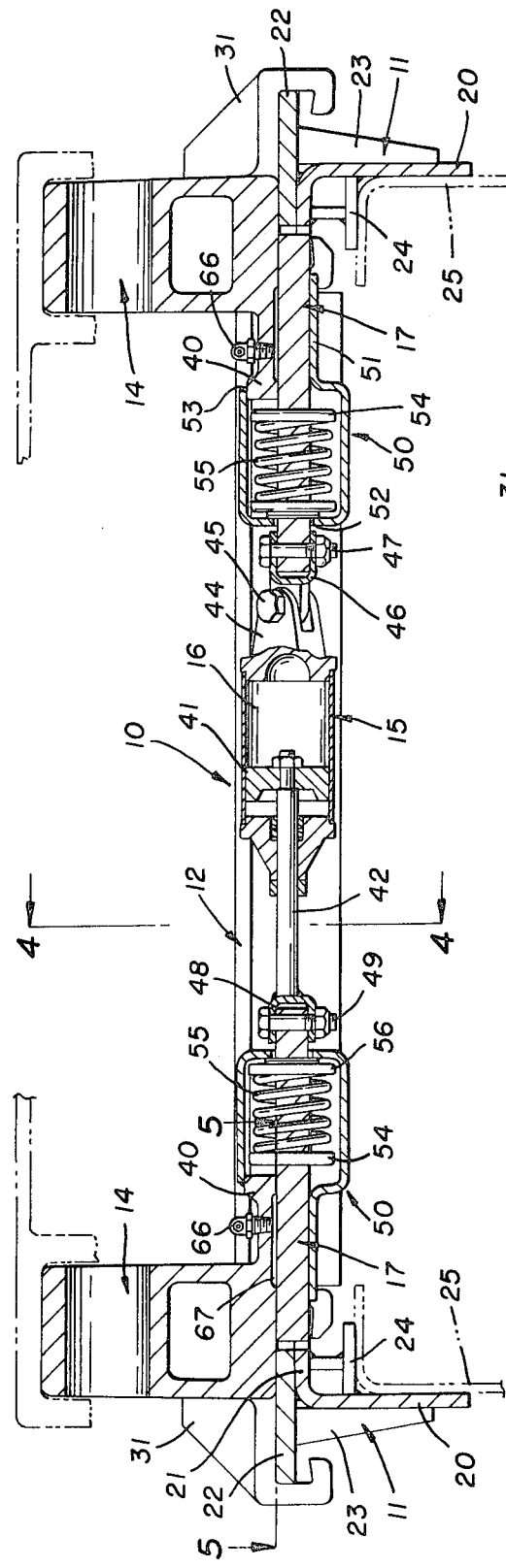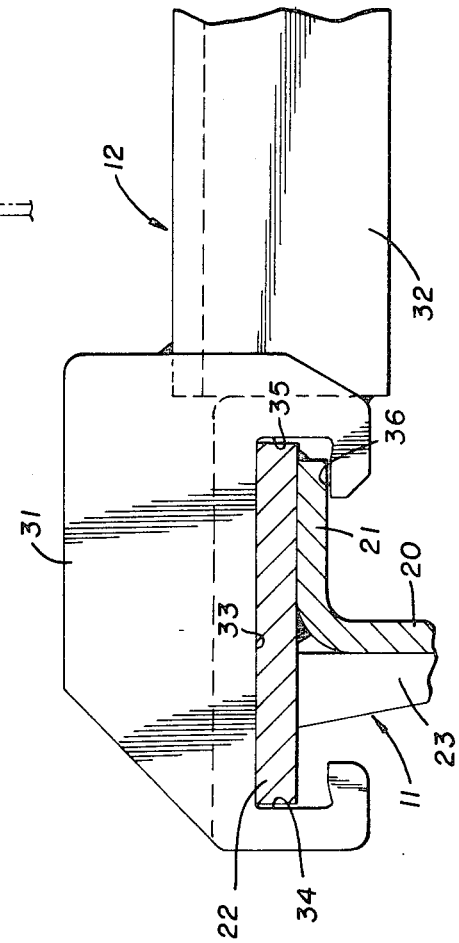

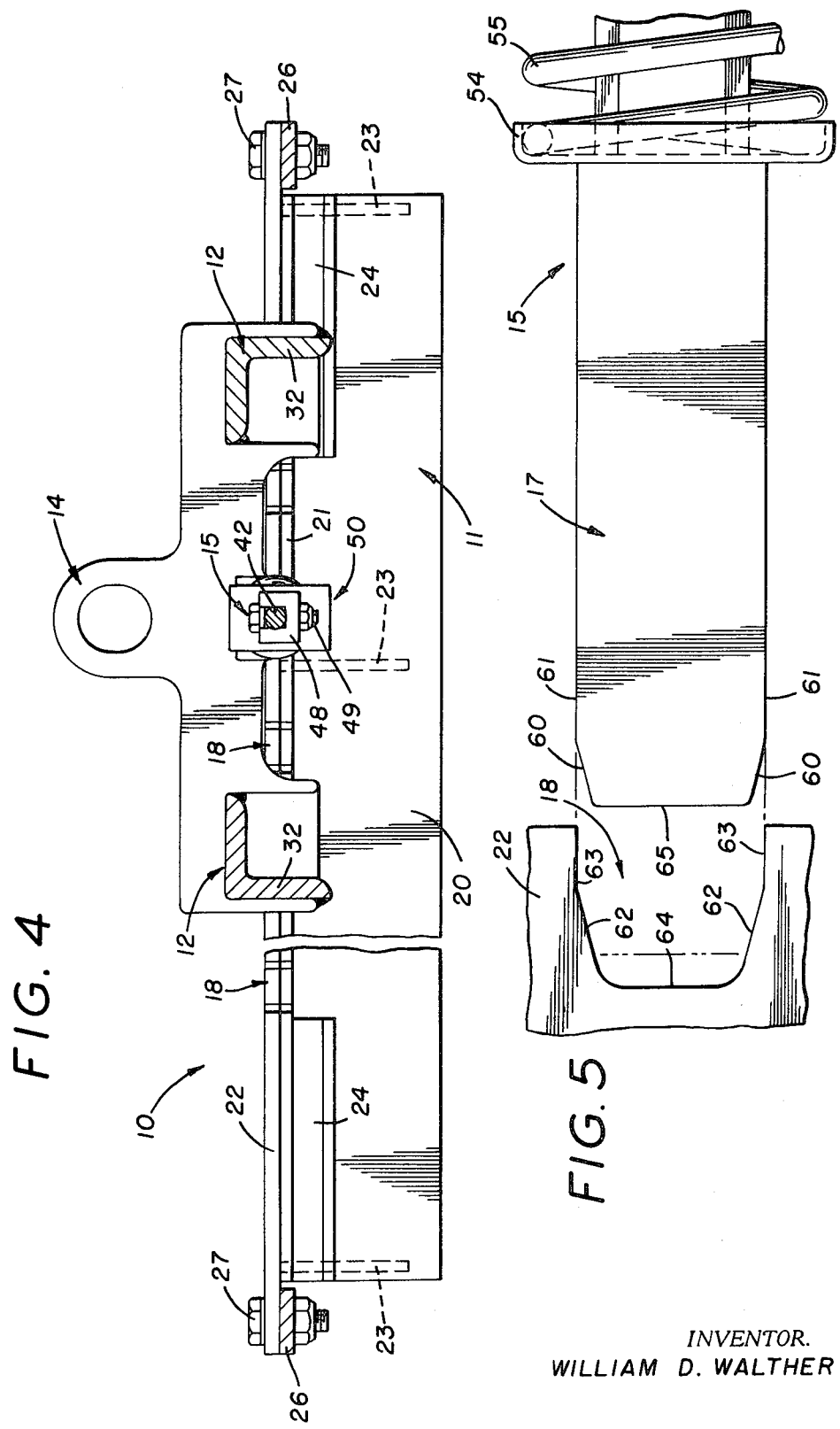

SLIDER MOUNT FOR FIFTH WHEELS

BACKGROUND OF THE INVENTION

The invention relates to a slider mount or adjustable mounting for fifth wheel coupler assemblies. A fifth wheel coupler assembly is carried on a tractor to engage a king pin on a trailer.

The slider mount may be used with any conventional fifth wheel coupler assembly such as disclosed in U.S. Pat. No. 3,485,513, patented Dec./1969 to the Dayton Steel Foundry Company.

The prior art has many forms of slider mounts or adjustable mountings for fifth wheel couplers. U.S. Pat. No. 2,903,275, patented Sept./1959, and U.S. Pat. No. 3,170,716, patented Feb./1965, to the inventors assignee the Dayton Steel Foundry Company represent two forms of adjustable fifth wheel mountings which have enjoyed commercial success.

However, it has been found that current truck operating practices, including higher speeds and increased weights, require a power operated slider mount with a minimum of slack or lateral or vertical play.

A power operated slider mount illustrative of the prior art is disclosed in U.S. Pat. No. 2,985,463, granted May/1961 to the Holland Hitch Company. This slider mount is of relatively complex construction and appears to feature a locking mechanism having opposed rake-like rack engaging shoe members extending outwardly through the trunnions and movable outside-in into engagement with correspondingly shaped (7° taper) rack bar members.

The slider mount of U.S. Pat. No. 3,170,716 has improved upon the operation of the slider mount of U.S. Pat. No. 2,985,463, particularly in the feature of spring biased lock bolts movable inside-out into engagement with correspondingly shaped (7° taper) notch-like receivers.

However, it has now been found that a slider mount may be constructed utilizing a minimum number of structural components and a power operated locking mechanism with improved locking plungers so as to maintain a fifth wheel coupler assembly in a predetermined position under extreme operating conditions.

SUMMARY OF THE INVENTION

The object of the invention is to provide an improved slider mount or adjustable mounting for fifth wheel coupler assemblies utilizing a minimum number of structural components.

It is a further object of the invention to provide a slider mount including a power operated locking mechanism with improved locking plungers which will maintain a fifth wheel coupler assembly in a predetermined position under extreme operating conditions.

These and other objects of the invention, and the advantages thereof, will be apparent in view of the Description of a Preferred Embodiment as set forth below.

In general, apparatus according to the invention has two parallel rail members adapted to be carried by a vehicle. A double span slider movably engages the rail members. Mounted on the slider are opposed trunnon blocks. A locking mechanism is carried by a slider on the side opposite the trunnon blocks. The locking mechanism is power operated and includes reciprocating plungers. The plungers move inside-out and have opposed angulated locking faces selectively engaging correspondingly shaped notches formed integrally in the rail members.

In the preferred embodiment, the angulated locking faces of the plungers have lead faces converging at an angle of substantially 15° from trailing faces lying in a plane transverse the orientation of the rail members. The rail members are composite structures having a vertical web plate with a laterally directed flange carrying a horizontal cap plate, the integrally formed locking notches being on the inner face of the web plate flange and cap plate.

DESCRIPTION OF THE DRAWINGS

FIG. 2 is a sectional view, taken substantially as indicated on line 2—2 of FIG. 1;

FIG. 3 is an enlarged fragmentary sectional view, taken substantially as indicated on line 3—3 of FIG. 1;

FIG. 4 is a fragmentary side view, taken in section substantially as indicated on line 4—4 of FIG. 2; and, FIG. 5 is a 1:1 scale fragmentary view of a locking plunger and locking notch, taken substantially as indicated on line 5—5 of FIG. 2.

DESCRIPTION OF A PREFERRED EMBODIMENT

Figure 1:
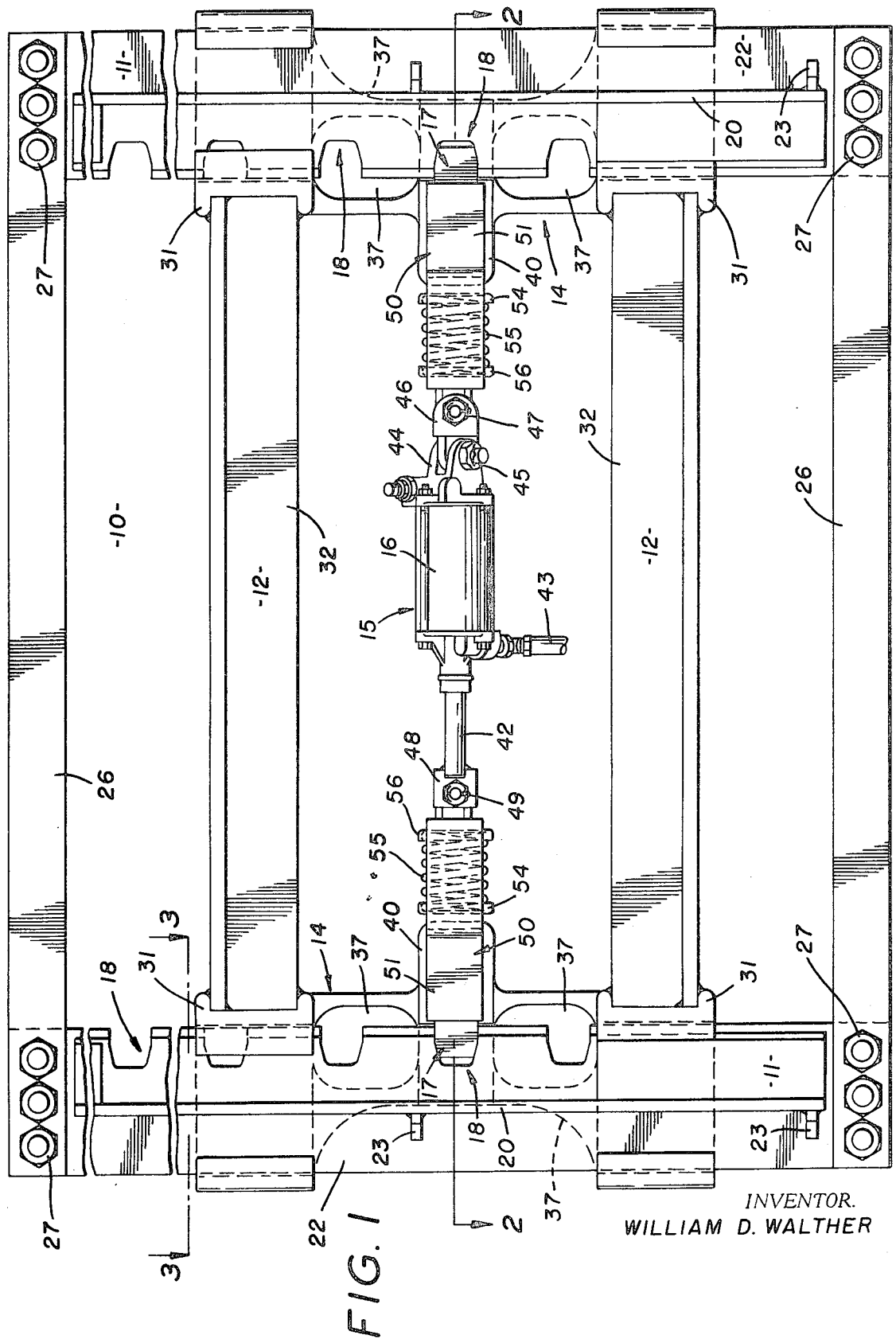
FIG. 1 is a plan view, looking from the vehicle frame, of a fifth-wheel mounting according to the invention.

A slider mount according to the invention is indicated generally by the numeral 10. The slider mount 10 has two parallel rail members indicated generally by the numeral 11. A double span slider indicated generally by the numeral 12 is carried by the rail members 11. Mounted on the upper side of the slider 12 are opposed trunnion blocks indicated generally by the numeral 14. A locking mechanism indicated generally by the numeral 15 is mounted on the under side of the slider 12. The locking mechanism is power operated as by a fluid pressure activated cylinder 16 and includes reciprocating plungers indicated generally by the numeral 17. The plungers 17 move inside-out and selectively engage notches indicated generally by the numeral 18 formed integrally in the rail members 11.

The rail members 11 are intended for fabrication from readily available standard structural shapes. As best shown in FIGS. 2 & 3, a rail member 11 is a composite structure having a vertical web plate 20 with an integrally associated laterally directed flange 21. The upper side of the flange 21 carries a horizontal cap plate 22. Attachment of the cap plate 22 to the flange 21 is assured by a series of gussets 23 which also impart structural rigidity to the composite structure. The rail members 11 may be attached in any suitable manner to the frame of a vehicle. As shown in FIG. 2, an elongated substructure 24 on the under side of the flange 21 may be welded to a frame component 25 of the vehicle (shown in chain lines).

As shown in FIGS. 1 & 4, the rail members 11 may be interconnected to form a unitary structure using front and rear cross-bars 26 attached as by bolts and nuts 27 to extensions of the cap plates 22.

The double span slider 12 is intended for fabrication from cast and machined foot pieces and readily available structural shapes. The slider 12 is generally rectangular with the rail engaging foot pieces 31 being cross-connected by two structural angles 32. Each foot piece is a relatively heavy metal casting having a medial portion carrying a trunnion 14 for mounting a conventional fifth wheel coupler assembly.

As best shown in FIG. 3, the end portion of each foot piece 31 has a machined configuration with interior surfaces defining a shoe flange for positive engagement with a rail member 11. These interior surfaces include a primary load-bearing surface 33 for sliding contact with the rail cap plate 22 and guide surfaces 34, 35 & 36 for confining contact with the cap plate 22 and the flange 21 inwardly of the substructure 24.

Referring to FIG. 1, the medial portion of each slider on foot piece 31 may be cored or relieved in the areas indicated at 37 thereby reducing the overall weight without sacrifice of mechanical strength. At the midpoint of each slider foot piece 31 is an inwardly facing boss 40 for mounting and housing components of the locking mechanism 15, including the locking plungers 17, so as to provide the locking effect at a point directly beneath the axis of the trunnions 14.

Referring to FIG. 2, the locking mechanism actuating cylinder 16 has a piston 41 connected to an extensible shaft 42. Introduction of fluid, such as compressed air or hydraulic fluid, into the body of the cylinder as through a conduit 43 (FIG. 1) will move the shaft 42 to a retracted position. The base end of the cylinder 16 has a clevis 44 connected as by a bolt 45 to the pin of another clevis 46 connected as by a bolt 47 to the inboard end of a locking plunger 17. The outer end of the cylinder shaft 42 carries a clevis 48 connected as by a bolt 49 to the inboard end of the opposite locking plunger 17.

Each plunger 17 is housed within a machined slot in the boss 40 of a foot piece 31. Each plunger is held in place by a housing bracket indicated 50. A housing bracket 50 is fabricated as by stamping from a metal strap to have an extension 51 attached to the boss 40 for sliding contact with the underface of a plunger 17. Inwardly of extension 51, the bracket 50 has a cupped portion with a slotted end 52 for passage there through of the inboard end of the plunger 17. The upper side of the bracket 50 is attached to the boss 40 as by the weldment indicated at 53.

As best shown in FIG. 5, the medial portion of each plunger 17 is reduced in width and carries a cup bracket 54. The cup bracket 54 provides the outboard seat for a coiled compression spring 55. The inboard end of the spring 55 is seated in another cup bracket 56 aligned with the bracket slot 52 and attached to the bracket 50. The spring 55 will normally maintain the plungers 17 in the extended position.

The extended position of a plunger 17 is shown in chain lines in FIG. 5. A plunger has opposed angulated locking faces with lead faces 60 converging at an angle of substantially 15° from trailing faces 61 lying in a plane transverse to the orientation of the rail members 11. The plunger faces 60 and 61 are received in the notches 18 which have correspondingly shaped faces 62 and 63. Outwardly of the faces 62, each notch 18 has a relieved portion 64 to provide an absence of contact with the entry face 65 of a plunger 17 to compensate for normal wear of locking faces and locking notches. The notch faces 62 and 63 and relieved portion 64 are formed integrally in a rail member as by machining the web plate flange 21 and the cap plate 22.

It has been found that the opposed angulated locking faces 60 and 61 will compensate for wear on the notch faces 62 and 63 during the repeated operations of adjusting the mounting point for fifth wheel coupler assemblies. It has also been found that the mating contact of surfaces 61 and 63 will prevent the plungers 17 from being pushed out of the notches 18 under conditions of well lubricated parts (as through grease fittings 66) and high imposed loads encountered during the operations of coupling with or pulling, a trailer.

Referring to FIG. 2, a further feature of the invention is the provision of a grease pocket 67 on the underside of each boss 40 of a slider foot piece 31. Grease inserted under pressure through the fittings 66 serves to hydraulically support and facilitate longitudinal movement of the slider 12 on the rail members 11 and reciprocating movement of the plungers 17.

What is claimed is:

1. A slider mount (10) having two parallel rail members (11), a double span slider (12) carried by said rail members, a locking mechanism (15) on said slider including reciprocating locking plungers (17) and locking notches (18) on said rails, said locking plungers being movable inside out into selective engagement with said notches, said locking plungers each having opposed angulated locking faces with lead faces (60) converging at an angle of substantially 15° from trailing faces (61) lying in a plane transverse to the orientation of said rail members, said locking notches each having correspondingly shaped faces (62 and 63).

2. A slider mount according to claim 1 wherein said locking notches have a relieved portion (64) to provide an absence of contact with the entry face (65) of a locking plunger compensating for wear of said locking faces and locking notches.

3. A slider mount according to claim 1 wherein said rail members are composite structures having a vertical web plate (20) with a laterally directed flange (21) carrying a horizontal cap plate (22), the locking notches being integrally formed on the inner face of said web plate flange and said cap plate.

* * * * *